Dec. 11, 1956 H. OHLSEN 2,773,533
SUBSTANTIALLY U-SHAPED, RESILIENT LOCKING DEVICE
FOR USE WITH RECESSED NUT AND BOLT
Filed July 23, 1953

INVENTOR
HELMUT OHLSEN
BY
ATTY.

United States Patent Office 2,773,533
Patented Dec. 11, 1956

2,773,533

SUBSTANTIALLY U-SHAPED, RESILIENT LOCKING DEVICE FOR USE WITH RECESSED NUT AND BOLT

Helmut Ohlsen, Welsede, Kreis Hameln, Pyrmont, Germany

Application July 23, 1953, Serial No. 369,836

Claims priority, application Germany July 29, 1952

3 Claims. (Cl. 151—6)

The use of replaceable screws always requires a device to prevent an unintentional loosening of the nuts owing to vibration and shocks.

For this purpose different solutions have been proposed. Spring-washers or washers of sheet metal of different shape are used. Furthermore castellated nuts are used where for safety reasons a split pin is applied, which passes through the apertures in the nuts and through a hole in the bolt. The safety devices have the disadvantage to be not completely reliable or the application of a washer e. g. of sheet metal is restricted to a certain space which must be available directly around the nut, or when using a split pin, the shank of the screw is weakened by the hole. As a special disadvantage it must be regarded that this hole can only be made either when the screw is fitted or the nut only can be secured in a certain position on the thread.

All these disadvantages are removed by the invention, which brings a safety device for screw nuts which prevents an unintentional loosening, whereby the features to obtain a reliable locking of the nut in any desired position on the shank in distances of ⅙ of a turning of the nut, are already provided for when the screw is manufactured.

According to the invention the shank has one or several grooves extending parallelly to the axis of the shank. These grooves extend along the length of the thread and have such a depth that the body of the screw is not interfered with. That means that no infringement of the stability takes place.

A castellated nut may be used which has on its lower side short cuts which are located directly below the apertures for the pin on the upper side of the nut. In the same way usual nuts may be used which have on one side grooves like a castellated nut. On the lower side below these grooves only short grooves are machined. In this way at the lower side of the nut a reduction of carrying thread is avoided.

As safety device a steel wire clamp is used which can be replaceably applied, and which effects the locking in that the pin slots of the nut and the longitudinal groove of the shank are barred up. The correct position of the safety device is safeguarded by bent parts of wire which enter into the short slots on the lower side of the nut. Since the bent parts of the steel wire are situated in the prefabricated short slots a plain face of the nut is assured, so that the nut properly bears against the surface of the element through which the bolt is fitted.

If also a plain upper face of the nut is desired the safety device is constructed as a steel band clamp. A flexible bent element which has approximately the same shape as the nut, embraces the nut half-way round and its ends are bent in direction to the nut. The ends of this bent element are so shaped that projections on the upper side are entering into the grooves made on the upper surface of the nut. These projections extend into the grooves in the body of the screw, and the nut is locked against any turning. To keep the steel band clamp in the correct position, short pin-like projections are made on the lower side of the clamp. These short pin-like projections enter into the short slots made on the lower side of the nut.

When the safety device is taken off, e. g. to unscrew the nut or to tighten it, it can be applied again to safeguard the nut after the desired manipulation has been carried through, as the wire or the bent clamps are elastic because they are made of steel. Two examples of a safety device for screw nuts are shown in the drawing.

Figure 1:
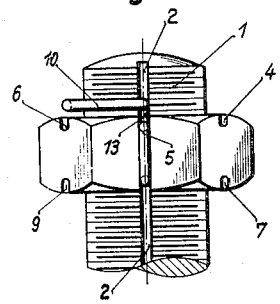
Fig. 1 shows the shank of a screw with grooves and nut and applied steel wire clamp.

The shank 1 of a screw has parallelly to its axis a groove 2. This groove 2 extends all over the length of the thread of the screw. The depth of the groove 2 corresponds to the height of the thread. To increase the security a further groove 3 may be made into the shank of the screw in the diametrically opposite side. The nut which is used with such a device is either a castellated nut or has grooves 4, 5, 6 on its upper side as in a castellated nut. On the lower side of the nut also grooves 7, 8, 9 are made. These grooves, however, extend only a short distance into the nut and not up to the thread of the nut. These short grooves which are located in the outer margin of the nut, are situated exactly vertically below the grooves which are formed in the upper surface of the nut.

Figure 3:
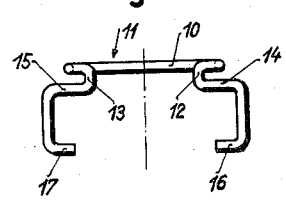
Fig. 3 shows a single steel wire clamp viewed in direction of the arrow in Fig. 2.

In Fig. 3 an example of a steel wire clamp 10 is shown. The middle part of the clamp is an elastic ring 11 which passes around the screw. The ends of the ring 11 are bent inwards and downwards. These parts of the steel wire clamp 12, 13 into the grooves 2, 3 on the shank of the screw. A further bending 14, 15 radially outwards gives the clamp that shape which is necessary to lock the nut by entering besides the grooves 2, 3 also into the grooves 4, 5, 6 on the upper side of the nut. To keep the device in its safeguarding position, the steel wire is now bent downwards and embraces with its free ends 16, 17 the nut whereby the ends 16, 17 are entering into the short grooves 7, 8, 9 on the lower side of the nut. As the safety device is made of steel wire it is possible to replace it at any time when it is required.

The figures show the application of a clamp to a screw having two grooves. If the shank has only one groove, only one side of the clamp is formed in the described manner whereas the bend of the other side in downwards direction 13 is not carried so far to the centre that it bears against the shank. The pin like parts 16, 17 of the device which are responsible for a proper fit of the device in its safeguarding position enter into the apertures on the lower side of the nut, so that a completely plain bearing face of the nut is insured.

Figure 4:
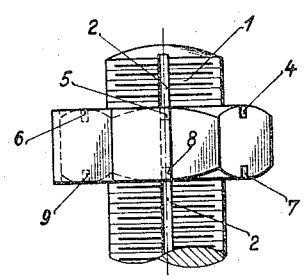
Fig. 4 shows a screw with grooves and nut, safeguarded by a steel band clamp.
Figure 2:
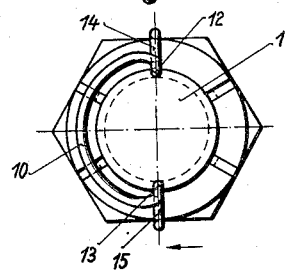
Fig. 2 shows a view from above of Fig. 1.
Figure 5:
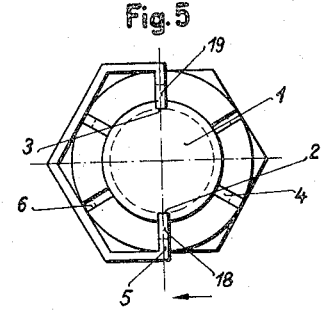
Fig. 5 shows a view from above of Fig. 4.
Figure 6:
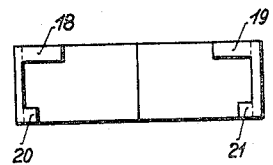
Fig. 6 shows a single steel band clamp viewed in direction of the arrow of Fig. 5.

Another example to form the safety device in the way of a steel band clamp is shown in the Figures 4, 5 and 6. The steel band clamp is then used when besides a plain bearing face also a plain outer surface of the nut is desired. The steel band clamp embraces half the circumference of the nut with close relation to the form of the nut.

The free ends of the steel band are bent radially to the centre whereby the centre part of the steel band ends is removed and only two pin-like projections are left which extend above and below the nut. The upper pin-like projections 18, 19 have such a length that they pass through the grooves in the upper side of the nut and enter into the grooves of the shank. The projections 20, 21 on the lower side of the steel band are shorter and are only responsible for the proper fit of the steel band clamp. The projections of the steel band which extend above and below the nut are countersunk in the respective grooves of the upper and lower surface of the nut, so that plain upper and lower surfaces of the nut are obtained.

I claim:

1. In combination with a bolt having longitudinal recesses, a nut threaded thereon and having radial grooves in the upper and lower end portions thereof, and a safety device for said bolt and nut comprising a substantially U-shaped central spring portion, the ends of said portions having upper and lower inwardly directed projections, said upper projections being located in upper grooves of the nut and extending into the recess of the bolt, and the lower projections extending at least into lower grooves of the nut, whereby said nut will be locked against rotation on said bolt and said safety device will be retained in position.

2. The combination as set forth in claim 1, wherein the central spring portion of the safety device is located in a plane normal to the axis of the bolt and above the nut and wherein the upper projections are U-shaped.

3. The combination as set forth in claim 1, wherein the safety device comprises a resilient metallic band surrounding the nut in semi-annular relation thereto, and wherein the end portions of the band are of stem-like shape projecting radially inward.

References Cited in the file of this patent

UNITED STATES PATENTS

| | | |
|---|---|---|
| 374,274 | Schapiro | Dec. 6, 1887 |
| 723,395 | Kissinger | Mar. 24, 1903 |
| 993,918 | Von Hagel | May 30, 1911 |
| 999,632 | Covert | Aug. 1, 1911 |
| 1,017,770 | Latshaw | Feb. 20, 1912 |
| 1,070,094 | Young | Aug. 12, 1913 |
| 1,146,101 | Rider | July 13, 1915 |
| 1,191,955 | Ellison | July 25, 1916 |
| 1,204,548 | Dixon | Nov. 14, 1916 |
| 1,448,178 | Andrix | Mar. 13, 1923 |
| 2,395,234 | Schlueter | Feb. 19, 1946 |

FOREIGN PATENTS

| | | |
|---|---|---|
| 371,254 | Great Britain | Apr. 21, 1932 |